United States Patent [19]

Brandstetter

[11] Patent Number: 4,594,791
[45] Date of Patent: Jun. 17, 1986

[54] BRIDGE TYPE COORDINATE MEASURING MACHINE

[75] Inventor: Robert W. Brandstetter, Fairborn, Ohio

[73] Assignee: The Warner & Swasey Company, Cleveland, Ohio

[21] Appl. No.: 694,378

[22] Filed: Jan. 24, 1985

[51] Int. Cl.⁴ .............................. G01B 5/03; G01B 7/03
[52] U.S. Cl. ......................................... 33/503; 33/1 M
[58] Field of Search ................................. 33/1 M, 503

[56] References Cited

U.S. PATENT DOCUMENTS

| | | | |
|---|---|---|---|
| 2,620,256 | 12/1952 | Kerns et al. | 346/32 |
| 3,241,243 | 3/1966 | Speer | 33/174 |
| 3,639,993 | 2/1972 | Sartorio | 33/503 |
| 3,749,501 | 7/1973 | Wieg | 356/169 |
| 3,774,311 | 11/1973 | Stemple | 33/503 |
| 3,840,993 | 10/1974 | Shelton | 33/1 M |
| 4,155,173 | 5/1979 | Sprandel | 33/174 |
| 4,175,327 | 11/1979 | Herzog | 33/1 M |
| 4,315,371 | 2/1982 | Kotani et al. | 33/1 M |
| 4,442,607 | 4/1984 | Sakata et al. | 33/503 |

FOREIGN PATENT DOCUMENTS

| | | | |
|---|---|---|---|
| 2546544 | 5/1976 | Fed. Rep. of Germany | 33/1 M |
| 55-69008 | 5/1980 | Japan | |
| 518161 | 7/1972 | U.S.S.R. | |
| 621955 | 8/1978 | U.S.S.R. | 33/1 M |

*Primary Examiner*—Richard R. Stearns
*Attorney, Agent, or Firm*—Raymond J. Eifler

[57] ABSTRACT

A bridge type coordinate measuring machine characterized by a bridge (20) that has a closed loop configuration encircling the measuring machine base (10). The bridge (20) includes two uprights (21, 22), an upper member (23) connecting the uprights together and at least one lower member (24) connecting the uprights together below the upper surface (11) of the base (10). Bearings (41) for the bridge are offset inwardly from the vertical axes of the uprights of the bridge and a guideway (12, 13), along which the bearings travel, is located on each side of the base. The bearings (41) operate upwardly, downwardly and sidewardly against the surfaces of the guideways (12, 13) located on the sides of the base (10). This arrangement both stiffens and raises the resonant frequency of the bridge, thereby improving the measuring accuracy and repeatability of the coordinate measuring machines performance.

22 Claims, 4 Drawing Figures

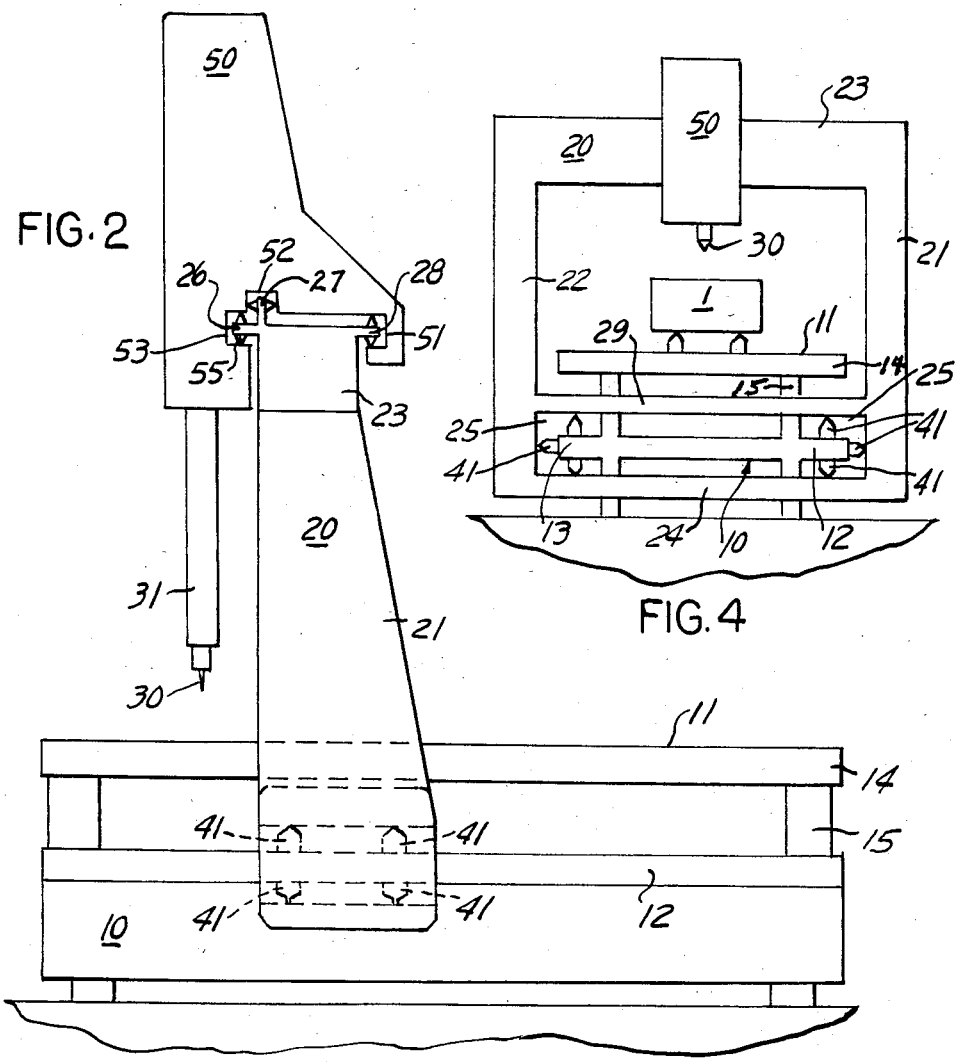
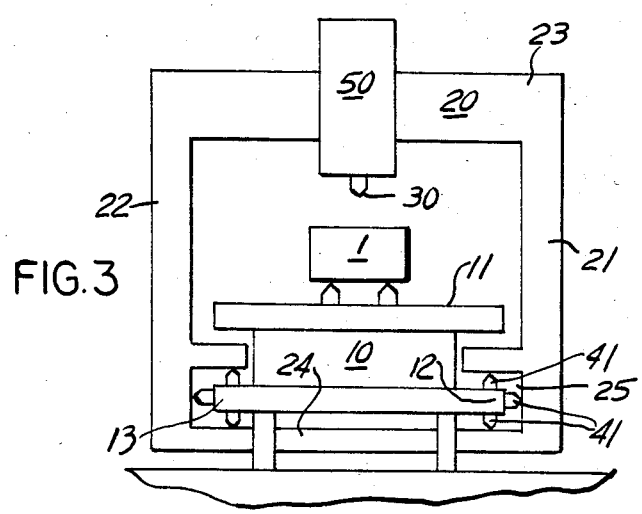

BRIDGE TYPE COORDINATE MEASURING MACHINE

This invention relates to a bridge type coordinate measuring machine (CMM) for measuring the dimensions of a workpiece.

A bridge type coordinate measuring machine is generally comprised of a base, a bridge moveably mounted to the base, a carriage moveably mounted to the upper portion of the bridge, a probe moveably mounted to the carriage and a measuring and computation system that responds to movement of the probe for measuring the dimensions of a workpiece located on the upper surface of the base. Examples of bridge type coordinate measuring machines may be found in U.S. Pat. Nos. 3,749,501 entitled "Measuring Machine" issued July 31, 1973; and 3,840,993 entitled "Coordinate Measuring Machine" issued Oct. 15, 1974. The important functions of a coordinate measuring machine are its accurate measurement and its repeatability i.e. ability to repeat or obtain the same measurement from the same workpiece. In a bridge type coordinate measuring machine accuracy and repeatability may be adversely affected by vibration and relative movement between the uprights of the bridge. Poor stiffness or rigidity of the bridge permits relative movement between the uprights of the bridge while height, spacing and stiffness all affect resonant frequency, which if low, makes the measuring probe mounted on the bridge more susceptible to vibrations.

One approach to minimizing or dampening the effect of vibrations on a CMM has been to mount the CMM on an air bag apparatus or large concrete platform. These approaches are expensive, space consuming and only isolate external vibrations i.e., ground vibrations. Internal vibrations e.g., caused by electro mechanical servo mechanisms mounted on the machine, would not be isolated or dampened.

One approach to minimizing the effect of relative movement between the bridge uprights is discussed in the U.S. Pat. No. 3,749,501 patent where a position indicator is located on each upright. However, this increases the cost for the positional and measurement apparatus of the CMM and still does not address the problem of an undesirable low resonant frequency that can be present in a bridge structure e.g. a resonant frequency below 20 Hertz can adversely effect the measuring accuracy of a CMM.

Accordingly, the accuracy of the measurements made by a bridge type coordinate measuring machine may be adversely affected by poor rigidity and vibrations because of a low resonant frequency of the bridge. This is especially true of a bridge type CMM used for measuring large workpieces, such as an automobile body or engine, because of the height and spacing of the uprights of such a bridge e.g., about one to two meters high with one and a half to two and a half meter spacing.

DISCLOSURE OF THE INVENTION

The invention is a bridge type coordinate measuring machine that has a closed loop bridge configuration that encircles the upper surface of a measuring machine base upon which a workpiece is placed for measurement and is characterized by the location of the bearings for the bridge being offset from the vertical axes of the uprights of the bridge and by a guideway for the bearings located on each side of the base.

One advantage of this invention is that it improves the measuring accuracy of a CMM used for measuring large workpieces such as an automobile engine or body.

Another advantage of this invention is that it improves the rigidity of the bridge of a CMM.

Another advantage of this invention is that it lowers the effect of vibrations on the probe mounted on the bridge of a CMM by increasing the resonant frequency of the bridge.

Another advantage of this invention is that it minimizes the need for an expensive system to isolate the measuring probe of a CMM from external vibrations.

DETAILED DESCRIPTION OF THE INVENTION

FIGS. 1 and 2 are perspective views of a bridge type coordinate measuring machine incorporating the principles of this invention.

FIG. 3 is a cutaway view of a CMM showing one arrangement of the bridge mounted to the base of a CMM.

FIG. 4 is still another arrangement of a bridge mounted to the base of a CMM.

Figure 1:
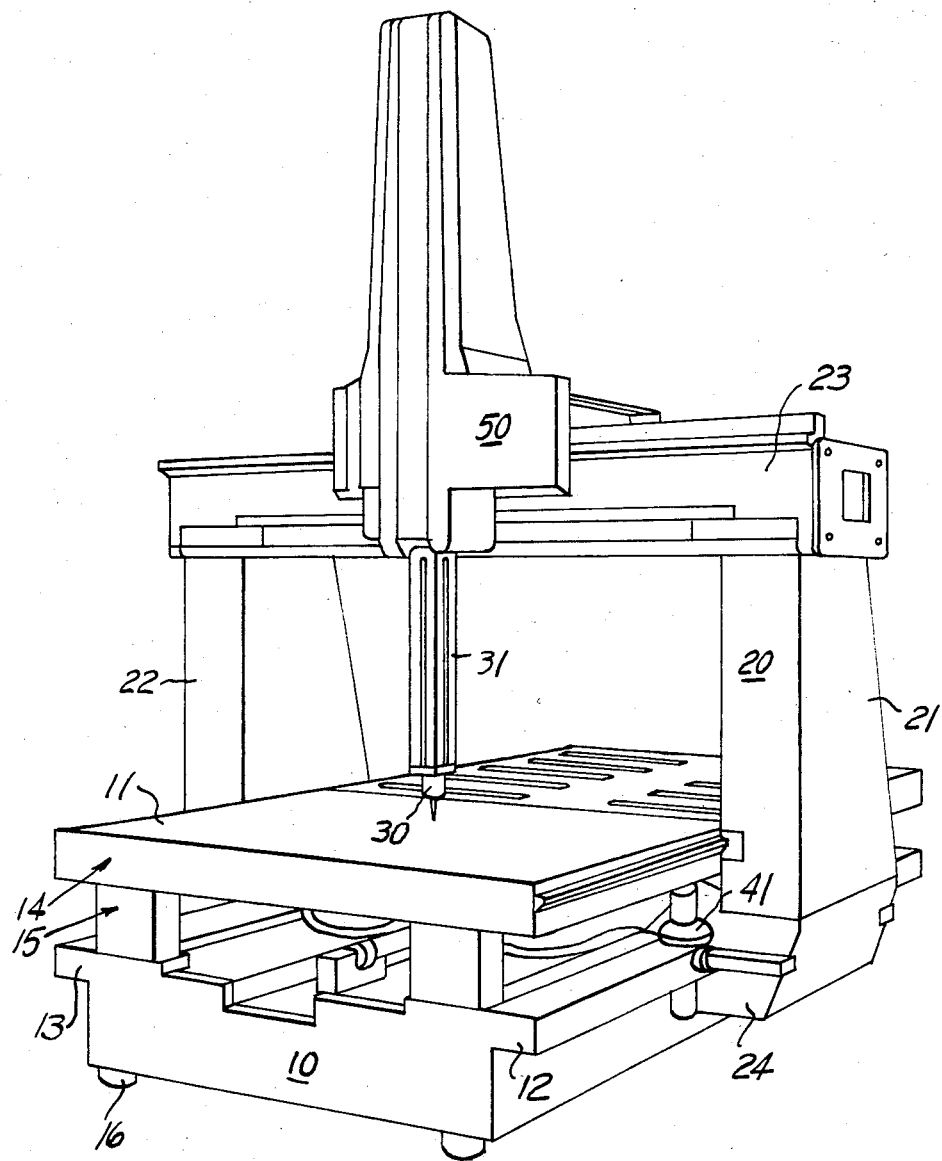

Referring now to the drawings, FIG. 1 illustrates a bridge type coordinate measuring machine of the type having a base 10, a bridge 20 moveably mounted to the base 10, a carriage 50 moveably mounted to the bridge 20, and a probe 30 moveably mounted to the carriage 50. The base 10 includes an upper surface 11 upon which a workpiece (not shown) to be measured is located and guideways 12, 13. The base 10 is divided into an upper table portion 14 separated from the lower portion by legs 15. Rubber feet 16 at the bottom of the base 10, minimize the affect of external vibrations on the CMM. This arrangement of the guide ways 12, 13, and legs 15 provides space, if desired, for a motor and suitable drive mechanism for moving the bridge 20 to be located at the center of the base 10. The bridge 20 includes two uprights 21, 22 connected together by an upper member 23 and a lower member 24. Moveably mounted on the upper member 23 of the bridge 20 is a carriage 50 which has moveably mounted thereto a probe shaft 31 having a probe 30 at one end thereof. The probe 30 is generally of the type that, upon contact with a piece to be measured, provides a signal to appropriate computation and measuring apparatus. One example of such a probe may be found in U.S. Pat. No. 4,270,275 entitled "Probes" and issued June 6, 1981. The bridge 20 is moveably mounted to the base 10 along guide ways 12, 13, the surfaces of which interface with bearings 41 mounted in respective channels 25 in the bridge 20. Preferably, air bearings 41 are used to facilitate movement of the bridge 20 along the guideways 12, 13 of the base 10. Movement of the bridge, carriage and probe shaft 31 allows the probe to move and take measurements in three dimensions. Electrical or mechanical means responsive to movement of the probe indicate the position of the probe in 3 coordinates and, when required, calculate measurements e.g., The Warner and Swasey Company, Sheffield Measurement Division measurement processor model MP3.

FIG. 2 illustrates how the carriage 50 is moveably mounted to the upper member 23 of the bridge 20 along guideways 26, 27, 28 the surfaces of which interface with bearings 55 in respective channels 51, 52, 53 in the carriage 50. The probe 30 is mounted to the bridge 20 for movement along 2 axis and is moveable along a third axis by movement of the bridge. Mounting arrangements for the probe and carriage are described in further detail in the U.S. Pat. Nos. 3,749,501 and 3,840,993. Mechanical or preferably air bearings 55 are used to facilitate movement of the carriage 50 relative to the bridge 20. Also shown is the arrangement of the upper and lower bearings 41 of the bridge 20 that coact with the surfaces of one of the guide ways 12 of the base 10.

FIG. 3 illustrates further details of how the air bearings 41, located in channels 25 in the bridge 20, interface with the surfaces of the guide ways 12, 13 of the base 10. Preferably, the lower member 24 of the bridge 20 is located above the bearings 41 and below the table portion 14 of the base 10. The upper table portion 14 of the base 10 is supported by only three legs 15. This provides better vibrational and deflectional isolation than would four legs i.e., one in each corner of the table 14.

FIG. 4 illustrates an alternate embodiment of the invention wherein the bridge 20 has two lower connecting members 24, 29 with the bearings 41 coacting with the guide ways 12, 13 of the base 10 located between the 2 lower members 24, 29 of the bridge 20.

I claim:

1. A bridge type coordinate measuring machine of the type having a base (10) having an upper surface (11) for supporting a work piece to be measured, a bridge (20) having two uprights (21, 22) and a first member (23) connecting the uprights (21, 22) together above the upper surface (11) of said base (10), means (12, 13, 41) for moveably mounting the bridge (20) to the base (10), a probe (30), and means (50, 31) for mounting said probe (30) to the first member (23) of said bridge (20) for movement relative to said bridge and to said base (10), characterized in that:
    the bridge (20) has a closed loop configuration that encircles the upper surface (11) of said base (10) said closed loop configuration formed by a second member (24) connecting together the uprights (21, 22) of the bridge (20) below the upper surface (11) of said base (10) and below the means (12, 13) for moveably mounting the bridge (20) to the base (10).

2. A bridge type coordinate measuring machine of the type having a base (10) having an upper surface (11) for supporting a work piece to be measured, a bridge (20) having two uprights (21, 22) and a first member (23) connecting the uprights (21, 22) together above the upper surface (11) of said base (10), means (12, 13, 41) for moveably mounting the bridge (20) to the base (10), a probe (30), and means (50, 31) for mounting said probe (30) to the first member (23) of said bridge (20) for movement relative to said bridge and to said base (10), characterized in that:
    the bridge (20) has a closed loop configuration that encircles the upper surface (11) of said base (10) said closed loop configuration formed by a second member (24) connecting together the uprights (21, 22) of the bridge (20) below the upper surface (11) of said base (10); and by
    the means for moveably mounting the bridge (20) to the base (10) includes a pair of guideways (12, 13), one of said guideways (12) located on one side of said base (10) and the other of said guideways (13) located on the opposite side of said base (10), said guideways (12, 13) coacting with bearings (41) in a respective channel (25) in each of said uprights (21, 22) of said bridge (20) to facilitate movement of said bridge (20) on said base, said second member (24) connecting the uprights (21, 22) of the bridge (20) together located below said guideways (12, 13).

3. A bridge type coordinate measuring machine of the type having a base (10) having an upper surface (11) for supporting a work piece to be measured, a bridge (20) having two uprights (21, 22) and a first member (23) connecting the uprights (21, 22) together above the upper surface (11) of said base (10), means (12, 13, 41) for moveably mounting the bridge (20) to the base (10), a probe (30), and means (50, 31) for mounting said probe (30) to the first member (23) of said bridge (20) for movement relative to said bridge and to said base (10), characterized in that:
    the bridge (20) has a closed loop configuration that encircles the upper surface (11) of said base (10) said closed loop configuration formed by a second member (24) connecting together the uprights (21, 22) of the bridge (20) below the upper surface (11) of said base (10); and by
    guideways (12, 13) along which said bridge (20) is moveable and
    a third member (29) connecting the uprights (21, 22) of the bridge (20) together below the surface (11) of said base (10) and above said guideways (12, 13), said second member (24) connecting together the uprights (21, 22) of the bridge (20) located below said guideways (12, 13).

4. A bridge type coordinate measuring machine as described in claim 3 wherein the height of each of the two uprights (21, 22) is greater than one meter.

5. A bridge type coordinate measuring machine of the type having a base (10) having an upper surface (11) for supporting a work piece to be measured, a bridge (20) having a closed loop configuration that encircles the upper surface (11) of said base (10) said closed loop configuration formed by two uprights (21, 22), a first member (23) connecting the uprights (21, 22) together above the upper surface (11) of said base (10), and a second member (24) connecting together the uprights (21, 22) of the bridge (20) below the upper surface (11) of said base (10), means (12, 13, 41) for moveably mounting the bridge (20) to the base (10), a probe (30), and means (50, 31) for mounting said probe (30) to the first member (23) of said bridge (20) for movement relative to said bridge and to said base (10), the means for moveably mounting the bridge (20) to the base (10) characterized by:
    a pair of guideways (12, 13), located below the upper surface (11) of the base (10), one of said guideways (12) located on one side of said base (10) and the other of said guideways (13) located on the opposite side of said base (10), each of said guideways (12, 13) coacting with respective bearings (41) located in a respective channel (25) formed between said second member (24), and an inwardly extending portion of each of said uprights (21, 22).

6. A coordinate measuring machine as described in claim 5 wherein said bearings (41) include bearings that coact against upwardly and downwardly facing surfaces of a respective guideway (12, 13).

7. A coordinate measuring machine as described in claim 6 wherein said bearings (41) include bearings that coact against a side of each of the guideways (12, 13).

8. A coordinate measuring machine as described in claim 6 including a third member (29) connecting the uprights (21, 22) of the bridge (20) together below the surface (11) of said base (10) and above said guideways (12, 13).

9. A bridge type coordinate measuring machine as described in claim 5, wherein the bearings (41) are located between the vertical axes of the uprights (21, 22).

10. A bridge type coordinate measuring machine as described in claim 6 wherein the bearings (41) are located between the vertical axes of the uprights (21, 22).

11. A bridge type coordinate measuring machine as described in claim 7 wherein the bearings (41) are located between the vertical axes of the uprights (21, 22).

12. A bridge type coordinate measuring machine as described in claim 6 wherein the bearings (41) coacting upwardly and downwardly are located beneath the upper surface (11) of the base (10).

13. A bridge type coordinate measuring machine as described in claim 7 wherein the bearings (41) coacting upwardly and downwardly are located beneath the upper surface (11) of the base (10).

14. A bridge type coordinate measuring machine as described in claim 8 wherein the bearings (41) coacting upwardly and downwardly are located beneath the upper surface (11) of the base (10).

15. A bridge type coordinate measuring machine as described in claim 10 wherein the bearings (41) coacting upwardly and downwardly are located beneath the upper surface (11) of the base (10).

16. A bridge type coordinate measuring machine as described in claim 11 wherein the bearings (41) coacting upwardly and downwardly are located beneath the upper surface (11) of the base (10).

17. A bridge type coordinate measuring machine as described in claim 5 wherein the second member (24) is located below the bearings.

18. A bridge type coordinate measuring machine as described in claim 17 including a third member (29) connecting the uprights (21, 22) of the bridge together below the surface (11) of the base (10) and above the guideways (12, 13).

19. A bridge type coordinate measuring machine of the type having a base (10) having an upper surface (11) for supporting a work piece to be measured, a bridge (20) having a closed loop configuration that encircles the upper surface (11) of said base (10) said closed loop configuration formed by two uprights (21, 22), a first member (23) connecting the uprights (21, 22) together above the upper surface (11) of said base (10), and a second member (24) connecting together the uprights (21, 22) of the bridge (20) below the upper surface (11) of said base (10), means (12, 13, 41) for moveably mounting the bridge (20) to the base (10), a probe (30), and means (50, 31) for mounting said probe (30) to the first member (23) of said bridge (20) for movement relative to said bridge and to said base (10), the means for moveably mounting the bridge (20) to the base (10) characterized by:

a pair of guideways (12, 13), each of said guideways (12, 13) coacting with a respective plurality of bearings (41), said guideways and bearings located directly below the upper surface (11) of the base (10), one of said guideways (12) and its respective bearings (41) located at one side of said base (10) and the other of said guideways (13) and its respective bearings (41) located at the opposite side of said base (10).

20. A coordinate measuring machine as described in claim 19 wherein said bearings (41) coact against upwardly and downwardly facing surfaces of a respective guideway (12, 13).

21. A coordinate measuring machine as described in claim 20 wherein said bearings (41) also coact against a side of each of the guideways (12, 13).

22. A coordinate measuring machine as described in claim 19 wherein said bearings (41) are located between the vertical axes of the uprights (21, 22).

* * * * *